Oct. 26, 1926.
C. C. FARMER
1,604,269
PACKING AND PROCESS OF MAKING
Filed May 25, 1923
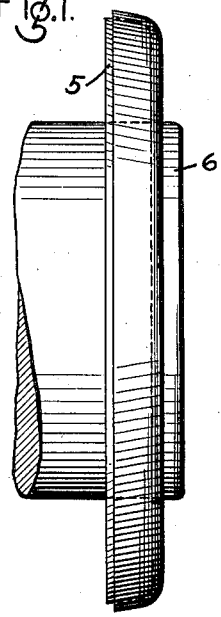
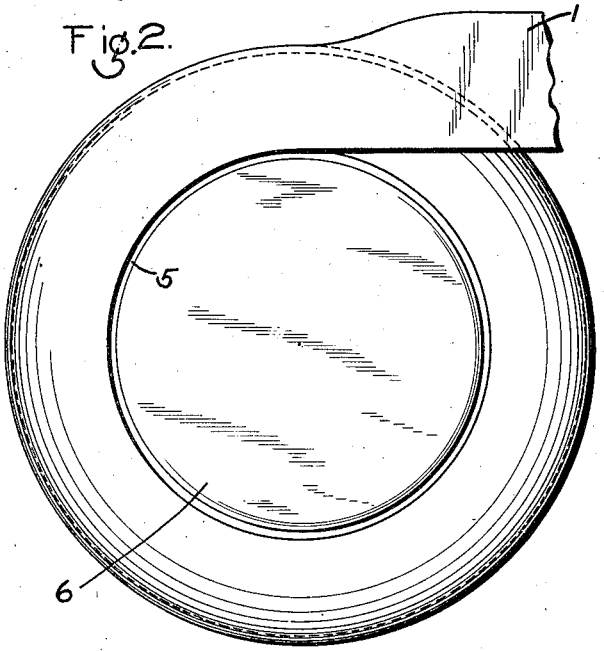
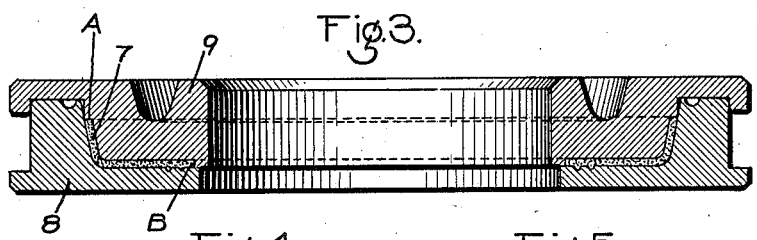
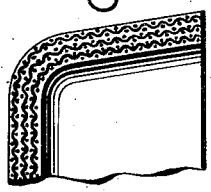
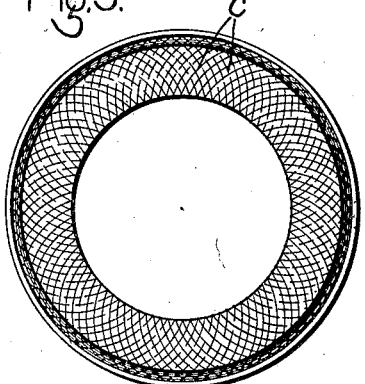
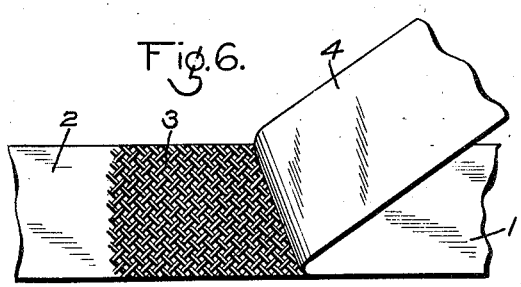
INVENTOR
CLYDE C. FARMER
BY *Wm. M. Cady*
ATTORNEY Patented Oct. 26, 1926.

1,604,269

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PACKING AND PROCESS OF MAKING.

Application filed May 25, 1923. Serial No. 641,411.

This invention relates to piston packing and the process of making same.

Heretofore, leather has been extensively employed in the manufacture of piston packing, particularly of the cup-shaped type as almost universally applied to air brake cylinder pistons.

Leather suitable for the severe service to which brake cylinder piston packing rings are subject is constantly becoming more difficult to obtain and the cost is continually increasing, and furthermore, leather packings have always been more or less unsatisfactory, due to their deterioration through the action of lubricating oil which is supplied to brake cylinders.

In view of the above difficulties, the principal object of my invention is to provide an improved non-leather packing ring and process for making same.

In the accompanying drawing; Fig. 1 is a side elevation of the mandrel or forming device upon which the packing rings are formed in accordance with my invention; Fig. 2 a face view thereof; Fig. 3 a central sectional view of the packing ring mold; Fig. 4 an enlarged section of a portion of a piston packing ring constructed in accordance with my invention; Fig. 5 a face view of a piston packing ring, showing the disposition and arrangement of the threads of the reinforcing fabric; and Fig. 6 a view illustrating the construction of one of the packing material strips employed in making the piston packing.

My improved piston packing is built up of layers of packing material strips, the strips being first formed in the following manner.

A rubber composition which is oil proof is provided and in the dough state is rolled out into sheets. Sheets of reinforcing fabric having open meshes and preferably of cotton are also provided and then a sheet of rubber composition and a sheet of fabric are passed through heated calender rolls, so that the substance of the rubber composition sheet is forced through the meshes of the fabric.

The product of this operation is again passed through calender rolls with another sheet of rubber composition which is pressed into the other side of the fabric, so that the final product comprises a sheet of fabric with sheets of rubber composition on opposite sides and having the rubber composition of the rubber sheets united through the meshes of the fabric.

The calendered sheets produced as above described are then cut into strips on a bias cutter, so that the threads of the fabric run diagonally with respect to the strip, as shown in Fig. 6, the reference number 1 indicating the finished strip, the numeral 2 the rubber composition at one side of the fabric 3 having open meshes, and the rubber composition 4 at the other side of the fabric 3. By cutting the strip on the bias, great flexibility is secured which not only enables the strip to stretch and conform to the curved form on which the piston packing is built up, but provides increased flexibility in the finished packing ring.

Strips of packing material produced as above described may then be spliced together by lapping the ends and pressing same together, so that the ends adhere. The ribbon of packing material may then be wound on spools ready for use in the manufacture of piston packing.

For cup-shaped piston packing rings, such as are commonly employed in connection with brake cylinder pistons, a form or mandrel 5, having the desired cup-shape is provided, as shown in Figs. 1 and 2. Said form being mounted to turn on a cylindrical supporting member 6.

In the forming of a packing ring, the form 5 is first coated with a suitable rubber cement, so as to cause the first strip to adhere to the form and then preferably a strip of rubber composition without reinforcing fabric is wound on the form 5. Then a strip of the fabric reinforced packing material 1 is wound on the form, the form being rotated by hand, as the packing material is applied. Owing to the fabric being cut on the bias, the material readily conforms to the curvature of the form without wrinkling.

After the first layer of packing material has been applied to the mandrel 5, a solvent, such as coal tar benzine, may be applied to the wound packing material, so as to facilitate the adherence of the next layer, which is now wound on the first layer, and in the same manner, any number of layers may be wound on the form.

After the desired number of reinforced fabric layers have been applied, I preferably apply a final layer of rubber composition, so that the inner and outer face of the packing ring will have an extra thickness of rubber.

These inner and outer coatings of rubber composition are preferably applied so that the edges overlap or project beyond the edges of the reinforced fabric layers, in order that the edges of the fabric may be completely enclosed when pressure is applied in the next operation.

The piston packing ring 7, formed as above described, is next placed in the female portion 8 of a mold, as shown in Fig. 3, and the male portion 9 of the mold is then applied.

The mold is then subjected to pressure by means of a pneumatic or hydraulic press and finally the mold is placed in a vulcanizer in order to vulcanize the packing ring. After vulcanization, the packing ring is removed from the mold and the edge of the ring is trimmed smooth, after which the packing ring is ready for service.

The overlapping edges of the outer rubber composition layers provide substance for enclosing the edges A and B of the packing ring when pressure is applied to the mold, so that in the finished packing ring, there will be no exposed fabric edges, which otherwise might be liable to absorb oil and moisture.

The fabric being disposed with the warp and woof threads running diagonally of the packing material strip, as shown in Fig. 6, when the packing material is wound on the mandrel, the fabric provides the elasticity required in order to conform to the face of the mandrel without wrinkling, and the threads assume the symmetrical arrangement indicated by the lines C in the finished packing ring 10.

Having now described my invention, what I claim as new and desire to secure by Letters Patent, is:—

1. The process of making a cup-shaped piston packing ring which consists in wrapping a strip of reinforced rubber composition packing material on a cup-shaping mandrel to form thereon one or more layers of packing material.

2. The process of making a cup-shaped piston packing ring which consists in cutting strips from a sheet of fabric reinforced rubber material with the fabric cut on the bias, and in then wrapping said strips on a cup-shaping mandrel.

3. The process of making a cup-shaped piston packing ring which consists in cutting strips from a sheet of rubber composition having an interposed sheet of fabric having open meshes, so that the threads of the fabric run diagonally with respect to the strip, and in then wrapping said strips on a cup shaping mandrel.

4. The process of making a cup-shaped piston packing ring which consists in first cutting a strip from a sheet of rubber composition having an interposed sheet of fabric with open meshes and with the threads of the fabric running diagonally with respect to the strip and in then wrapping said strip on a cup-shaping mandrel.

5. The process of making a cup-shaped piston packing ring which consists in wrapping a strip of packing material on a cup-shaping mandrel to form the cup-shaped packing ring, in then placing said packing ring in a mold, and in then applying pressure to said mold.

6. The process of making a cup-shaped piston packing ring which consists in wrapping a strip of packing material on a cup-shaping mandrel to form the cup-shaped packing ring, in then placing said packing ring in a mold, in then applying pressure to said mold, and in then vulcanizing the ring while in the mold.

7. A cup-shaped piston packing ring comprising one or more layers of packing material, each layer comprising rubber composition on opposite sides of an open mesh fabric, the fabric being so disposed that the threads run substantially symmetrically throughout the circumference of the ring.

8. A cup-shaped piston packing ring comprising one or more layers of packing material, each layer comprising rubber composition on opposite sides of an open mesh fabric, the threads of the fabric being disposed diagonally with respect to intersecting radii throughout the circumference of the ring.

9. A cup-shaped piston packing ring comprising one or more layers of packing material, each layer comprising rubber composition on opposite sides of an open mesh fabric, the threads of fabric being disposed symmetrically and diagonally with respect to intersecting radii throughout the circumference of the ring.

10. A cup-shaped piston packing ring comprising one or more layers of packing material, each layer comprising rubber composition on opposite sides of an open mesh fabric, the warp and woof threads of the fabric being disposed to form symmetrical arches with respect to radii of the ring and throughout the circumference of the ring.

11. The process of making a cup-shaped piston packing ring which consists in winding a strip composed of rubber composition on a cup-shaped mandrel, then winding thereon one or more layers of packing material composed of an open mesh fabric with rubber composition on opposite sides of the fabric, and then a strip composed of rubber composition.

12. The process of making a cup-shaped piston packing ring which consists in winding a strip composed of rubber composition on a cup-shaped mandrel, then winding thereon one or more layers of packing material composed of an open mesh fabric with rubber composition on opposite sides of the fabric, and then a strip composed of rubber composition, the strips of rubber composition being wound on the mandrel so that the outer edges overlap the outer edges of the layers of packing material.

In testimony whereof I have hereunto set my hand.

CLYDE C. FARMER.